United States Patent
Lin et al.

(10) Patent No.: US 11,067,694 B2
(45) Date of Patent: Jul. 20, 2021

(54) LOCATING METHOD AND DEVICE, STORAGE MEDIUM, AND ELECTRONIC DEVICE

(71) Applicant: Ninebot (Changzhou) Tech Co., Ltd., Jiangsu (CN)

(72) Inventors: Yukai Lin, Beijing (CN); Jianzhu Huai, Beijing (CN)

(73) Assignee: Ninebot (Changzhou) Tech Co., Ltd., Changzhou (CN)

( * ) Notice: Subject to any disclaimer, the term of this patent is extended or adjusted under 35 U.S.C. 154(b) by 67 days.

(21) Appl. No.: 16/430,360

(22) Filed: Jun. 3, 2019

(65) Prior Publication Data
US 2020/0209389 A1    Jul. 2, 2020

(30) Foreign Application Priority Data
Dec. 29, 2018   (CN) .......................... 201811643709.8

(51) Int. Cl.
| | | |
|---|---|---|
| *G01S 17/00* | (2020.01) | |
| *G01S 17/86* | (2020.01) | |
| *G06T 7/73* | (2017.01) | |
| *G06T 7/77* | (2017.01) | |

(Continued)

(52) U.S. Cl.
CPC .............. *G01S 17/86* (2020.01); *G01S 17/89* (2013.01); *G06K 9/6278* (2013.01); *G06T 7/73* (2017.01); *G06T 7/77* (2017.01); *G06T 2200/28* (2013.01); *G06T 2207/10004* (2013.01); *G06T 2207/20212* (2013.01); *G06T 2207/30204* (2013.01); *G06T 2207/30244* (2013.01)

(58) Field of Classification Search
CPC . G01S 17/86; G01S 17/89; G06T 7/73; G06T 7/77; G06T 2200/28; G06T 2207/10004; G06T 2207/20212; G06T 2207/30204; G06T 2207/30244; G06K 9/6278
See application file for complete search history.

(56) References Cited

U.S. PATENT DOCUMENTS

| | | | | |
|---|---|---|---|---|
| 10,089,531 | B2 * | 10/2018 | Lee | .......................... G06F 16/58 |
| 10,515,110 | B2 * | 12/2019 | Jing | .................... G06F 16/2453 |

(Continued)

FOREIGN PATENT DOCUMENTS

| | | |
|---|---|---|
| CN | 107688184 A | 2/2018 |
| WO | 2018140701 A1 | 8/2018 |

OTHER PUBLICATIONS

The extended European search report for the EP patent application No. 19178274.7, dated Dec. 16, 2019.

*Primary Examiner* — Khai M Nguyen
(74) *Attorney, Agent, or Firm* — Gang Yu

(57) ABSTRACT

Provided are a locating method and device, a storage medium and an electronic device. The method includes: respectively determining first locating information indicated by a first locating image under a predetermined coordinate system and second locating information indicated by a second locating image under the predetermined coordinate system, wherein the first locating image and the second locating image are locating images acquired in a same scenario in different ways; combining the first locating information and the second locating information to acquire third locating information; locating based on the third locating information.

14 Claims, 3 Drawing Sheets

(51) Int. Cl.
*G01S 17/89* (2020.01)
*G06K 9/62* (2006.01)

(56) References Cited

U.S. PATENT DOCUMENTS

2019/0346271 A1* 11/2019 Zhang .................. G01S 7/4808
2020/0082549 A1* 3/2020 Dehghan .................. G06T 7/70

* cited by examiner

LOCATING METHOD AND DEVICE, STORAGE MEDIUM, AND ELECTRONIC DEVICE

TECHNICAL FIELD

The present disclosure relates to the field of locating, and in particular, to a locating method and device, a storage medium and an electronic device.

BACKGROUND

In different scenarios, different locating devices may be adopted to perform locating. There is a large difference between indoor locating and outdoor locating. An indoor environment is relatively closed, and usually has a high requirement on the locating accuracy. In the indoor environment, locating information cannot be accurately acquired through common locating/positioning tools such as Global Positioning System (GPS). For example, during navigation by using a navigation device (for example, a mobile robot) in an indoor environment, locating information cannot be accurately acquired in a scenario where a part of environment textures is not abundant enough and light intensity changes greatly. This factor influences locating accuracy and navigation performance, and thus the application of the navigation device in an indoor environment cannot satisfy a navigation requirement.

With regard to the above technical problem, no effective solution has been proposed in the related art.

SUMMARY

Embodiments of the present disclosure provide a locating method and device, a storage medium and an electronic device, which may at least solve a problem in the related art that locating information is invalid or locating accuracy is poor may be low in certain scenarios.

According to an embodiment of the present disclosure, there is provided a locating method, including: respectively determining first locating information indicated by a first locating image under a predetermined coordinate system and second locating information indicated by a second locating image under the predetermined coordinate system, wherein the first locating image and the second locating image are locating images acquired in a same scenario in different ways; combining the first locating information and the second locating information to acquire third locating information; and locating based on the third locating information.

In at least one exemplary embodiment, before respectively determining the first locating information indicated by the first locating image under the predetermined coordinate system and the second locating information indicated by the second locating image under the predetermined coordinate system, the method may further include: acquiring the first locating image through a visual camera and a preset sensor by using a Simultaneous Localization And Mapping (SLAM) technology; and/or, acquiring the second locating image through a Lidar or depth camera and a preset sensor by using a Lidar SLAM technology.

In at least one exemplary embodiment, a matching similarity between a scene object characteristic location of the first locating image and a scene object characteristic location of the second locating image exceeds a predetermined similarity.

In at least one exemplary embodiment, determining the first locating information indicated by the first locating image under the predetermined coordinate system may include: determining a plurality of object characteristic points included in the first locating image; and marking a plurality of first coordinate points corresponding to the plurality of object characteristic points in the predetermined coordinate system to acquire the first locating information, wherein the first locating information comprises the plurality of first coordinate points.

In at least one exemplary embodiment, determining the second locating information indicated by the second locating image under the predetermined coordinate system may include: determining a plurality of object characteristic points included in the second locating image; and marking a plurality of second coordinate points corresponding to the plurality of object characteristic points in a predetermined coordinate system to acquire second locating information, wherein the second locating information includes the plurality of second coordinate points.

In at least one exemplary embodiment, the first locating information and the second locating information are combined in one of the following ways to acquire the third locating information: Bayesian statistical theory; neural network technology; Kalman filtering.

According to another embodiment of the present disclosure, a locating device is provided, including a memory and a processor, where a computer program is stored in the memory, and the computer program is executed by the processor, and is configured to implement the following program modules: a determination module, configured to respectively determine first locating information indicated by a first locating image under a predetermined coordinate system and second locating information indicated by a second locating image under the predetermined coordinate system, wherein the first locating image and the second locating image are locating images acquired in a same scenario in different ways; a combination module, configured to combine the first locating information and the second locating information to acquire third locating information; and a locating module, configured to locate based on the third locating information.

In at least one exemplary embodiment, when the computer program is executed by the processor, the computer program is further configured to implement the following program modules: a first acquiring module, configured to acquire the first locating image through a visual camera and a preset sensor by using a Simultaneous Localization And Mapping (SLAM) technology before the determination module respectively determines the first locating information indicated by the first locating image under the predetermined coordinate system and the second locating information indicated by the second locating image under the predetermined coordinate system; and/or, a second acquiring module, configured to acquire the second locating image through a Lidar or depth camera and a preset sensor by using a Lidar SLAM technology before the determination module determines the first locating information indicated by the first locating image under the predetermined coordinate system and the second locating information indicated by the second locating image under the predetermined coordinate system.

In at least one exemplary embodiment, a matching similarity between a scene object characteristic location of the first locating image and a scene object characteristic location of the second locating image exceeds a predetermined similarity.

In at least one exemplary embodiment, the determination module is configured to: determine a plurality of object characteristic points included in the first locating image; and mark a plurality of first coordinate points corresponding to the plurality of object characteristic points in the predetermined coordinate system to acquire the first locating information, wherein the first locating information comprises the plurality of first coordinate points.

In at least one exemplary embodiment, the determination module is configured to: determine a plurality of object characteristic points included in the second locating image; and mark a plurality of second coordinate points corresponding to the plurality of object characteristic points in the predetermined coordinate system to acquire the second locating information, wherein the second locating information comprises the plurality of second coordinate points.

In at least one exemplary embodiment, the combination module is configured to combine the first locating information and the second locating information in one of the following ways to acquire the third locating information: Bayesian statistical theory; neural network technology; Kalman filtering.

According to yet another embodiment of the present disclosure, a storage medium is further provided. A computer program is stored in the storage medium, wherein the computer program is configured to execute the operations in the method embodiment.

According to yet another embodiment of the present disclosure, an electronic device is further provided, including a memory and a processor, where the memory stores a computer program, and the processor is configured to run the computer program to execute the operations in any of the foregoing method embodiments.

Through the embodiments of the present disclosure, in a scenario where locating is required, the first locating information indicated by the first locating image under a predetermined coordinate system and the second locating information indicated by the second locating image under the predetermined coordinate system are respectively determined, the first locating information and the second locating information are combined to acquire the third locating information, and locating is performed based on the third locating information. The purpose of determining accurate locating information is achieved by combining different locating information. Therefore, the problem in the related art that locating information is invalid or locating accuracy is poor can be solved, thereby achieving an accurate locating effect.

BRIEF DESCRIPTION OF THE DRAWINGS

The drawings described herein are used to provide a deeper understanding of the present disclosure and form a part of the present application, and the schematic embodiments of the present disclosure and the description thereof are used for explaining the present disclosure rather than limiting the present disclosure. In the drawings.

DETAILED DESCRIPTION OF THE EMBODIMENTS

Hereinafter, the present disclosure will be described in detail with reference to the accompanying drawings in conjunction with embodiments. It should be noted that the embodiments and the features in the embodiments of the present application can be combined with each other if no conflict is caused.

It should be noted that the terms "first," "second," and the like in the description and claims of the present disclosure and the figures described above are used to distinguish similar objects, and are not used to describe a specific order or a sequence.

Figure 1:
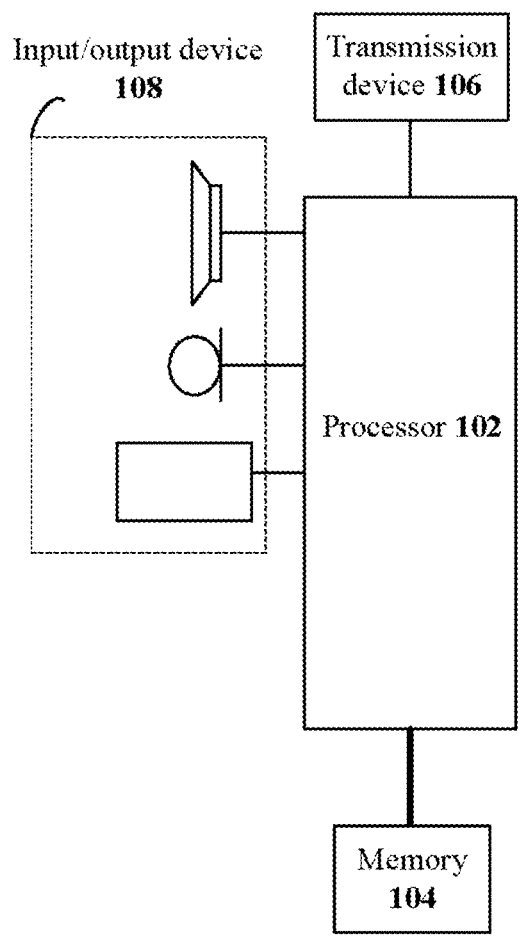
FIG. 1 is a block diagram of a hardware structure of a mobile terminal of a locating method according to an embodiment of the present disclosure.

The method embodiments provided by the embodiments of the present application may be executed in a mobile terminal, a computer terminal, or a similar operation device. Taking running the method embodiments on a mobile terminal as an example, FIG. 1 is a hardware structural block diagram of a mobile terminal of a locating method according to an embodiment of the present disclosure. As shown in FIG. 1, the mobile terminal 10 may include one or more (only one is shown in FIG. 1) processors 102 (the processor 102 may include, but is not limited to, a microprocessor (also referred to as Micro Control Unit, MCU) or a processing device such as a programmable logic device (e.g., Field Programmable Gate Arrays, FPGA) and a memory 104 for storing data. In at least one exemplary embodiment, the mobile terminal may further include a transmission device 106 for performing communication and an input/output device 108. It can be understood by a person of ordinary skill in the art that the structure shown in FIG. 1 is merely a schematic diagram, and the structure of the mobile terminal is not limited thereto. For example, the mobile terminal 10 may also include more or fewer components than that shown in FIG. 1, or have a different configuration than that shown in FIG. 1.

The memory 104 may be configured to store a computer program, for example, a software program and module of application software, such as a computer program corresponding to a locating method in the embodiment of the present disclosure. The processor 102 executes various function applications and data processing (e.g., implements the foregoing method) by running the computer program stored in the memory 104. The memory 104 may include high-speed random memory, and may also include non-volatile memory, such as one or more magnetic storage devices, flash memory, or other non-volatile solid state memory. In some examples, the memory 104 may further include memory which is remotely disposed relative to the processor 102 and is connected to the mobile terminal 10 via a network. Examples of such networks include, but are not limited to, the Internet, an intranet, a local area network, a mobile communication network, and combinations thereof.

The transmission device 106 is configured to receive or transmit data via a network. Specific examples of the network described above may include a wireless network provided by a communication provider of the mobile terminal 10. In one example, the transmitting device 106 includes a network adapter (Network Interface Controller, abbreviated as NIC), which may be connected to other network devices via a base station to communicate with the Internet. In one example, the transmission device 106 may be a radio frequency (RF) module for communicating with the Internet in a wireless manner.

Figure 2:
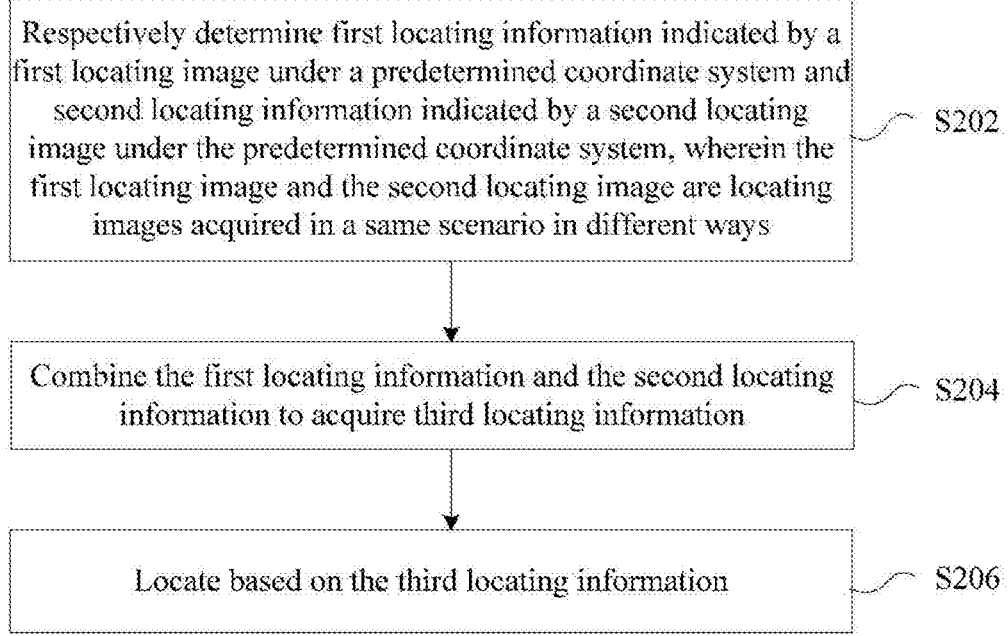
FIG. 2 is a flowchart of a locating method according to an embodiment of the present disclosure.

A locating method is provided in this embodiment. FIG. 2 is a flowchart of a locating method according to an embodiment of the present disclosure. As shown in FIG. 2, the flowchart includes the following operations S202 to S206.

In operation S202, first locating information indicated by the first locating image under a predetermined coordinate system and second locating information indicated by the second locating image under the predetermined coordinate system are respectively determined, wherein the first locating image and the second locating image are locating images acquired in a same scenario in different ways.

In operation S204, first locating information and second locating information are combined to acquire third locating information.

In operation S206: Locating is performed based on the third locating information.

Through the above operations, in a scenario where locating is required, the first locating information indicated by the first locating image under a predetermined coordinate system and the second locating information indicated by the second locating image under the predetermined coordinate system are respectively determined, the first locating information and the second locating information are combined to acquire third locating information, and locating is performed based on the third locating information. The purpose of determining accurate locating information is achieved by combining different locating information, the problem in the related art that locating information is invalid or locating accuracy is poor is solved, and an accurate locating effect is achieved.

In at least one exemplary embodiment, the execution entity of the foregoing operations may be a terminal or the like, but is not limited thereto.

It should be noted that a main flow in this embodiment is: firstly, a Visual SLAM technology and a Lidar SLAM technology are used for creation of images; then, a visual locating technology and a Lidar locating technology are used for locating; finally, a combined locating result acquired by a locating combination technology can be directly used for accurate locating.

In an exemplary embodiment, the method in the present embodiment may be applied to a mobile robot, a navigator, or the like, but is not limited thereto.

In an exemplary embodiment, the first locating image and the second locating image may be acquired by using the same image construction track, so that reference information of the first locating image corresponds to reference information of the second locating image, which facilitates the combination of the first locating information and the second locating information, and increases the accuracy of the determined locating information. As an exemplary implementation, the predetermined coordinate system may be embodied as a world coordinate system.

In an exemplary embodiment, the first locating image and the second locating image are locating images acquired in a same scene area, and the scene may be an outdoor scene or an indoor scene. For example, when the locating images are acquired in a lobby, both the first locating image and the second locating image include characteristic points of objects in the lobby.

Visual SLAM and Lidar SLAM technologies may be applied in locating or navigating scenarios. If only the Visual SLAM locating technology is used for locating, although the cost is low, the visual camera is subject to greater influences from environmental factors. For example, in an environment where light changes significantly and texture is poor, the locating matching degree of the visual camera may be decreased, which results in that the locating result often cannot satisfy the navigation requirement. Under such circumstances, locating needs to be carried out with the help of the Lidar technology, and the Lidar or depth camera can have better performance than the visual camera in scenarios where the texture is poor and light changes greatly. That is, before respectively determining the first locating information indicated by the first locating image under the predetermined coordinate system and the second locating information indicated by the second locating image under the predetermined coordinate system, the first locating image is acquired through a visual camera and a related sensor by using a Simultaneous Localization And Mapping (SLAM) technology; and/or the second locating image is acquired through a Lidar or depth camera and a related sensor by using a Lidar SLAM technology. The first locating information acquired by the visual camera needs to be combined with the locating information acquired by the Lidar or depth camera, so as to improve the locating effect in such environments.

The visual camera acquires the first locating image by using the SLAM technology. For example, a navigation device (e.g., a mobile robot) provided with a visual camera sets out from an unknown location of an unknown environment, during its movement, the location and attitude of the navigation device are determined based on repeatedly observed map characteristics (for example, corners, pillars, etc.), and then the locating maps (an embodiment of the locating images) are created according to the position of the navigation device in an incremental manner, thereby achieving simultaneous locating and mapping.

The Lidar or depth camera acquires the second locating image by using a Light Detection And Ranging (Lidar) SLAM technology. Herein, Lidar may be embodied as a laser radar.

It should be noted that the Visual SLAM and the Lidar SLAM are two different technologies. The Visual SLAM technology uses a visual camera, an Inertial Measurement Unit (IMU) and a mileage (optional). The Lidar SLAM technology uses a laser radar, an IMU and a mileage (optional). The preset sensor may refer to an IMU and a mileage (optional).

Figure 3:
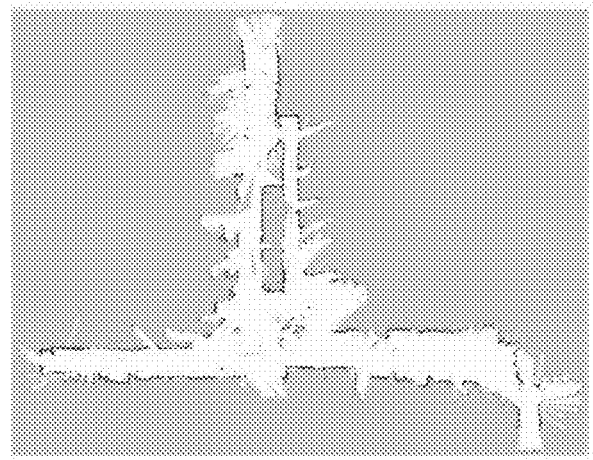
FIG. 3 is a grayscale diagram according to an embodiment of the present disclosure.

It should be noted that, unlike the point cloud image acquired by the Visual SLAM, the second locating image acquired by the Lidar SLAM is a grayscale image indicating whether there is any obstacle on the map, as shown in FIG. 3.

In an exemplary embodiment, the similarity between the scene and object characteristic locations indicated by the first locating image and the scene and object characteristic locations indicated by the second locating image exceeds a predetermined similarity. That is, the first locating image and the second locating image are images acquired in the same scene. The relative relationships (for example, relative relationships of locations) between the first locating image and the second locating image may be calculated by track matching, and can then be used for calculating the locations of the two types of locating information in the same world coordinate system.

In an exemplary embodiment, the first locating image is acquired through a visual camera and a preset sensor by using a Simultaneous Localization And Mapping (SLAM) technology; and the second locating image is acquired through a Light Detection And Ranging (Lidar) or depth camera and a preset sensor by using a Lidar SLAM technology. The first locating image and the second locating image may be respectively acquired by using the Visual SLAM technology and the Lidar SLAM technology directly in a certain scenario. As an alternative, completely matched first locating images and second locating images can be acquired by directly using a map construction trajectory used by one set of locating maps as the map construction trajectory of another set of locating maps.

In an exemplary embodiment, determining the first locating information indicated by the first locating image in the predetermined coordinate system may include: determining a plurality of object characteristic points included in the first locating image; marking a plurality of first coordinate points corresponding to the plurality of object characteristic points in the predetermined coordinate system to acquire the first locating information, wherein the first locating information includes the plurality of first coordinate points. In an exemplary embodiment, determining the second locating information indicated by the second locating image under the predetermined coordinate system may include: determining a plurality of object characteristic points included in the second locating image; marking a plurality of second coordinate points corresponding to the plurality of object characteristic points in the predetermined coordinate system to acquire the second locating information, wherein the second locating information includes the plurality of second coordinate points. In the present embodiment, the plurality of objects in the first locating image and the plurality of objects in the second locating image are the same objects, but the formats represented in different locating images are different, for example, characteristic points of the plurality of objects in the second locating image are shown in FIG. 3.

In an exemplary embodiment, the two kinds of locating information may be combined by using a sensor combination technology. For example, the first locating information and the second locating information may be combined in one of the following ways to acquire the third locating information: Bayesian statistical theory; neural network technology; Kalman filtering. The Kalman filtering may be an Extended Kalman Filter (EKF), and is a highly efficient recursive filter (self-regression filter). The merging of the first locating information and the second locating information can combine the advantages of both. The locating result acquired based on a depth camera can be used to make compensation for a scenario with poor visual locating, thereby significantly improving performance and robustness.

In an exemplary embodiment, the third locating information is marked in the world coordinate system, so that the locating image can be accurately drawn.

This embodiment is described below with reference to specific embodiments.

First Embodiment

This embodiment is described by taking a mobile robot provided with a visual camera and a depth camera as an example. In this embodiment, it is supposed that the mobile robot moves in a passageway of an office building. Since the office building has a lot of elongated corridors with white walls having weaker texture, conducting locating with a visual camera will have a large drift, while in such an environment, the depth camera behaves well and has higher locating accuracy and smaller error. Therefore, the visual camera and the depth camera simultaneously acquire a locating image, respectively being a first locating image and a second locating image, and first locating information and second locating information can be acquired based on the first locating image and the second locating image. The first locating information and the second locating information are combined by using an Extended Kalman Filter (EKF) to acquire third locating information. The result of locating using the third locating information may be more deviated to the depth camera with high accuracy, that is to say, the result of locating using the third locating information is closer to the result of locating using the second locating information. In such a situation, the locating of the mobile robot will not have a large locating error resulted from the locating drift of the visual camera, instead, more accurate locating can be performed based on the third locating information.

Second Embodiment

This embodiment is described by taking a mobile robot provided with a visual camera and a Lidar as an example. In this embodiment, it is supposed that the mobile robot operates in a large hall with open space and great light change. The mobile robot can acquire basic locating information by using a visual camera. When the mobile robot is close to the edge of the wall, the locating based on the visual camera is corrected by the Lidar to prevent the mobile robot from hitting the wall.

In summary, the complete process of this embodiment is as follows: 1) acquiring a first locating image by using a visual camera and a preset sensor; 2) acquiring a second locating image by using a Lidar and a preset sensor; 3) matching the first locating image and the second locating image, and calculating the relative transformation between the first locating image and the second locating image; 4) synchronously using a visual camera and a Lidar to acquire first locating information and second locating information, and converting the first locating information and the second locating information into a same world coordinate system; and 5) combining the first locating information and the second locating information by using a combining technology. By virtue of the above process, the locating performance and robustness can be improved.

Through the description of the above embodiments, it can be clearly understood by those skilled in the art that the method according to the above embodiments can be realized by means of software plus a necessary general hardware platform, and of course can alternatively be realized by hardware, although in many cases the former is a better implementation. Based on such understanding, the technical solutions of the embodiments of the present disclosure essentially or in part contributing to the prior art may be embodied in the form of a software product stored in a storage medium such as a ROM/RAM, a magnetic disk, and an optical disk. Several instructions are included to enable a terminal device (which may be a mobile phone, a computer, a server, or a network device) to execute the method described in each embodiment of the present disclosure.

The present embodiment further provides a locating device, and the device is configured to implement the above embodiments and exemplary implementations, and the description thereof is not repeated. As used below, the term "module" may implement a combination of software and/or hardware of a predetermined function. Although the device described in the following embodiments is preferably implemented in software, implementation of hardware, or a combination of software and hardware is also possible and contemplated.

Figure 4:
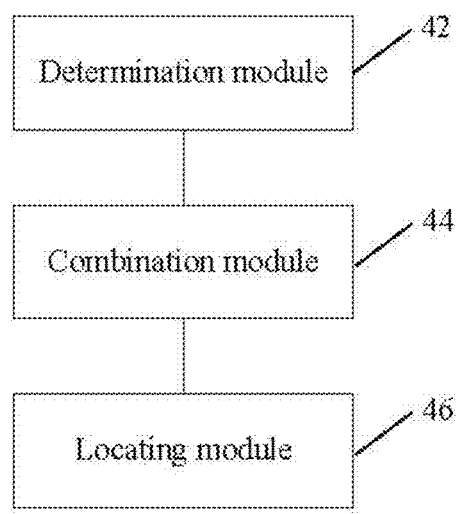
FIG. 4 is a structural block diagram of a locating device according to an embodiment of the present disclosure.

FIG. 4 is a structural block diagram of a locating device according to an embodiment of the present disclosure. As shown in FIG. 4, the device includes: a determination module 42, a combination module 44 and a locating module 46, which will be described in detail below.

The determination module 42 is configured to respectively determine first locating information indicated by a first locating image under a predetermined coordinate system and second locating information indicated by a second locating image under the predetermined coordinate system, wherein the first locating image and the second locating image are locating images acquired in a same scenario in different ways.

The combination module 44 is coupled to the determination module 42, and is configured to combine the first locating information and the second locating information to acquire third locating information.

The locating module 46 is coupled to the combination module 44, and is configured to perform locating based on the third locating information.

Through the above modules, in a scenario where locating is required, the first locating information indicated by the first locating image under a predetermined coordinate system and the second locating information indicated by the second locating image under the predetermined coordinate system are respectively determined, the first locating information and the second locating information are combined to acquire third locating information, and locating is performed based on the third locating information. The purpose of determining accurate locating information is achieved by combining different locating information, the problem in the related art that locating information is invalid or locating accuracy is poor is solved, and an accurate locating effect is achieved.

In at least one exemplary embodiment, the execution entity of the foregoing operation may be a terminal or the like, but is not limited thereto.

It should be noted that a main flow of the locating process of the locating device is as follows: firstly, a Visual SLAM technology and a Lidar SLAM technology are used for creation of images; then, a visual locating technology and a Lidar locating technology are used for locating; finally, a combined locating result acquired by a locating combination technology can be directly used for accurate locating.

In an exemplary embodiment, the method in the present embodiment may be applied to a mobile robot, a navigator, or the like, but is not limited thereto.

In an exemplary embodiment, the first locating image and the second locating image may be acquired by using the same image construction track, so that reference information of the first locating image corresponds to reference information of the second locating image, which facilitates the combination of the first locating information and the second locating information, and increases the accuracy of the determined locating information. As an exemplary implementation, the predetermined coordinate system may be embodied as a world coordinate system.

In an exemplary embodiment, the first locating image and the second locating image are locating images acquired in a same scene area, and the scene may be an outdoor scene or an indoor scene. For example, when the locating images are acquired in a lobby, both the first locating image and the second locating image include characteristic points of objects in the lobby.

Visual SLAM and Lidar SLAM technologies may be applied in locating or navigating scenarios. If only the Visual SLAM locating technology is used for locating, although the cost is low, the visual camera is subject to greater influences from environmental factors. For example, in an environment where light changes significantly and texture is poor, the locating matching degree of the visual camera may be decreased, which results in that the locating result often cannot satisfy the navigation requirement. Under such circumstances, locating needs to be carried out with the help of the Lidar technology, and the Lidar or depth camera can have better performance than the visual camera in scenarios where the texture is poor and light changes greatly. That is, before respectively determining the first locating information indicated by the first locating image under the predetermined coordinate system and the second locating information indicated by the second locating image under the predetermined coordinate system, the first locating image is acquired through a visual camera and a related sensor by using a Simultaneous Localization And Mapping (SLAM) technology; and/or the second locating image is acquired through a Lidar or depth camera and a related sensor by using a Lidar SLAM technology. The first locating information acquired by the visual camera needs to be combined with the locating information acquired by the Lidar or depth camera, so as to improve the locating effect in such environments.

The visual camera acquires the first locating image by using the SLAM technology. For example, a navigation device (e.g., a mobile robot) provided with a visual camera sets out from an unknown location of an unknown environment, during its movement, the location and attitude of the navigation device are determined based on repeatedly observed map characteristics (for example, corners, pillars, etc.), and then the locating maps (an embodiment of the locating images) are created according to the position of the navigation device in an incremental manner, thereby achieving simultaneous locating and mapping.

The Lidar or depth camera acquires the second locating image by using a Light Detection And Ranging (Lidar) SLAM technology. Herein, Lidar may be embodied as a laser radar.

It should be noted that the Visual SLAM and the Lidar SLAM are two different technologies. The Visual SLAM technology uses a visual camera, an Inertial Measurement Unit (IMU) and a mileage (optional). The Lidar SLAM technology uses a laser radar, an IMU and a mileage (optional). The preset sensor may refer to an IMU and a mileage (optional).

It should be noted that, unlike the point cloud image acquired by the Visual SLAM, the second locating image acquired by the Lidar SLAM is a grayscale image indicating whether there is any obstacle on the map, as shown in FIG. 3.

In an exemplary embodiment, the similarity between the scene and object characteristic locations indicated by the first locating image and the scene and object characteristic locations indicated by the second locating image exceeds a predetermined similarity. That is, the first locating image and the second locating image are images acquired in the same scene. The relative relationships (for example, relative relationships of locations) between the first locating image and the second locating image may be calculated by track matching, and can then be used for calculating the locations of the two types of locating information in the same world coordinate system.

In an exemplary embodiment, the first locating image is acquired through a visual camera and a preset sensor by using a Simultaneous Localization And Mapping (SLAM) technology; and the second locating image is acquired through a Light Detection And Ranging (Lidar) or depth camera and a preset sensor by using a Lidar SLAM technology. The first locating image and the second locating image may be respectively acquired by using the Visual SLAM technology and the Lidar SLAM technology directly in a certain scenario. As an alternative, completely matched first locating images and second locating images can be acquired by directly using a map construction trajectory used by one set of locating maps as the map construction trajectory of another set of locating maps.

In an exemplary embodiment, the determination module is configured to determine a plurality of object characteristic points included in the first locating image; mark a plurality of first coordinate points corresponding to the plurality of object characteristic points in a predetermined coordinate system to acquire the first locating information, wherein the first locating information includes the plurality of first coordinate points. The determination module is configured to determine a plurality of object characteristic points included in the second locating image; mark a plurality of second coordinate points corresponding to the plurality of object characteristic points in the predetermined coordinate system to acquire the second locating information, wherein the second locating information includes the plurality of second coordinate points. In the present embodiment, the plurality of objects in the first locating image and the plurality of objects in the second locating image are the same objects, but the formats represented in different locating images are different, for example, characteristic points of the plurality of objects in the second locating image are shown in FIG. 3.

In an exemplary embodiment, the two kinds of locating information may be combined by using a sensor combination technology. For example, the first locating information and the second locating information may be combined in one of the following ways to acquire the third locating information: Bayesian statistical theory; neural network technology; Kalman filtering. The Kalman filtering may be an Extended Kalman Filter (EKF), and is a highly efficient recursive filter (self-regression filter). The merging of the first locating information and the second locating information can combine the advantages of both. The locating result acquired based on a depth camera can be used to make compensation for a scenario with poor visual locating, thereby significantly improving performance and robustness.

In an exemplary embodiment, the third locating information is marked in the world coordinate system, so that the locating image can be accurately drawn.

This embodiment is described below with reference to specific embodiments.

First Embodiment

This embodiment is described by taking a mobile robot provided with a visual camera and a Lidar camera as an example. In this embodiment, it is supposed that the mobile robot moves in a passageway of an office building. Since the office building has a lot of elongated corridors with white walls having weaker texture, conducting locating with a visual camera will have a large drift, while in such an environment, the Lidar behaves well and has higher locating accuracy and smaller error. Therefore, the visual camera and the Lidar simultaneously acquire a locating image, respectively being a first locating image and a second locating image, and first locating information and second locating information can be acquired based on the first locating image and the second locating image. The first locating information and the second locating information are combined by using an Extended Kalman Filter (EKF) to acquire third locating information. The result of locating using the third locating information may be more deviated to the Lidar with high accuracy, that is to say, the result of locating using the third locating information is closer to the result of locating using the second locating information. In such a situation, the locating of the mobile robot will not have a large locating error resulted from the locating drift of the visual camera, instead, more accurate locating can be performed based on the third locating information.

Second Embodiment

This embodiment is described by taking a mobile robot provided with a visual camera and a Lidar as an example. In this embodiment, it is supposed that the mobile robot operates in a large hall with open space and great light change. The mobile robot can acquire basic locating information by using a visual camera. When the mobile robot is close to the edge of the wall, the locating based on the visual camera is corrected by the Lidar to prevent the mobile robot from hitting the wall.

In summary, the complete process of this embodiment is as follows: 1) acquiring a first locating image by using a visual camera and a preset sensor; 2) acquiring a second locating image by using a Lidar or depth camera and a preset sensor; 3) matching the first locating image and the second locating image, and calculating the relative transformation between the first locating image and the second locating image; 4) synchronously using a visual camera and a Lidar or depth camera to acquire first locating information and second locating information, and converting the first locating information and the second locating information into a same world coordinate system; and 5) combining the first locating information and the second locating information by using a combining technology. By virtue of the above process, the locating performance and robustness can be improved.

It should be noted that, the above modules may be implemented by software or hardware, and may be implemented by the following manners, but are not limited thereto: the above modules are all located in the same processor; alternatively, the above modules in any combination are respectively located in different processors.

An embodiment of the present disclosure further provides a storage medium in which a computer program is stored, wherein the computer program is configured to execute the operations in the method embodiments.

In the present embodiment, the storage medium may be configured to store a computer program for executing the above operations.

In at least one exemplary embodiment, the storage medium may include but is not limited to: various media that can store a computer program, such as a USB flash disk, a read-only memory (ROM for short), a random access memory (RAM for short), a mobile hard disk, a magnetic disk, or an optical disk.

An embodiment of the present disclosure further provides an electronic device, including a memory and a processor, where the memory stores a computer program, and the processor is configured to run the computer program to execute the operations in any of the above method embodiments.

In at least one exemplary embodiment, the electronic device may further include a transmission device and an input/output device, where the transmission device is connected to the processor, and the input/output device is connected to the processor.

In at least one exemplary embodiment, the processor may be configured to execute the above operations by a computer program.

For specific examples in this embodiment, reference may be made to the examples described in the foregoing embodiments and exemplary implementations, and details are not repeated herein in this embodiment.

Obviously, those skilled in the art should understand that the above modules or operations of the present disclosure may be implemented by a general-purpose computing device, which may be centralized on a single computing device or distributed on a network composed of a plurality of computing devices, and optionally, they can be implemented by program code executable by a computing device, so that they can be stored in a storage device and executed by the computing device. In some cases, the operations shown or described can be executed in a different order, or they can be made into various integrated circuit modules respectively, or a plurality of modules or operations are manufactured into a single integrated circuit module for implementation. As such, the present disclosure is not limited to any particular combination of hardware and software.

The foregoing description is merely exemplary embodiments of the present disclosure, and is not intended to limit the present disclosure. Various changes and modifications may be made by those skilled in the art. Any modifications, equivalent replacements and improvements made within the principles of the present disclosure shall fall within the scope of protection of the present disclosure.

What is claimed is:

1. A locating method, performed by a terminal device and comprising:
    controlling a visual camera and a Light Detection And Ranging (Lidar) or depth camera to respectively acquire a first locating image and a second locating image in a same scenario by using a same map construction trajectory, wherein a matching similarity between a scene object characteristic location of the first locating image and a scene object characteristic location of the second locating image exceeds a predetermined similarity;
    respectively determining first locating information indicated by the first locating image under a predetermined coordinate system and second locating information indicated by the second locating image under the predetermined coordinate system;
    combining the first locating information and the second locating information to acquire third locating information; and
    locating based on the third locating information.

2. The method as claimed in claim 1, wherein the method further comprises:
    acquiring the first locating image through the visual camera and a preset sensor by using a Simultaneous Localization And Mapping (SLAM) technology; and/or,
    acquiring the second locating image through the Lidar or depth camera and a preset sensor by using a Lidar SLAM technology.

3. The method as claimed in claim 2, wherein the first locating information and the second locating information are combined in one of the following ways to acquire the third locating information:
    Bayesian statistical theory;
    neural network technology;
    Kalman filtering.

4. The method as claimed in claim 1, wherein determining the first locating information indicated by the first locating image under the predetermined coordinate system comprises:
    determining a plurality of object characteristic points included in the first locating image; and
    marking a plurality of first coordinate points corresponding to the plurality of object characteristic points in the predetermined coordinate system to acquire the first locating information, wherein the first locating information comprises the plurality of first coordinate points.

5. The method as claimed in claim 4, wherein the first locating information and the second locating information are combined in one of the following ways to acquire the third locating information:
    Bayesian statistical theory;
    neural network technology;
    Kalman filtering.

6. The method as claimed in claim 1, wherein determining the second locating information indicated by the second locating image under the predetermined coordinate system comprises:
    determining a plurality of object characteristic points included in the second locating image; and
    marking a plurality of second coordinate points corresponding to the plurality of object characteristic points in the predetermined coordinate system to acquire the second locating information, wherein the second locating information comprises the plurality of second coordinate points.

7. The method as claimed in claim 6, wherein the first locating information and the second locating information are combined in one of the following ways to acquire the third locating information:
    Bayesian statistical theory;
    neural network technology;
    Kalman filtering.

8. The method as claimed in claim 1, wherein the first locating information and the second locating information are combined in one of the following ways to acquire the third locating information:
    Bayesian statistical theory;
    neural network technology;
    Kalman filtering.

9. A non-transitory computer readable storage medium storing a computer program, wherein the computer program is arranged to execute the method as claimed in claim 1 when running.

10. A locating device, comprising a visual camera, a Light Detection And Ranging (Lidar) or depth camera, a memory and a processor, wherein
    the visual camera and the Lidar or depth camera are respectively configured to acquire a first locating image and a second locating image in a same scenario by using a same map construction trajectory, wherein a matching similarity between a scene object characteristic location of the first locating image and a scene object characteristic location of the second locating image exceeds a predetermined similarity;
    the processor is configured to execute the following program modules stored in the memory:
    a determination module, configured to respectively determine first locating information indicated by the first locating image under a predetermined coordinate system and second locating information indicated by the second locating image under the predetermined coordinate system;
    a combination module, configured to combine the first locating information and the second locating information to acquire third locating information; and
    a locating module, configured to locate based on the third locating information.

11. The device as claimed in claim 10, wherein the processor is further configured to execute the following program modules stored in the memory:
   a first acquiring module, configured to control the visual camera and a preset sensor to acquire the first locating image by using a Simultaneous Localization And Mapping (SLAM) technology before the determination module respectively determines the first locating information indicated by the first locating image under the predetermined coordinate system and the second locating information indicated by the second locating image under the predetermined coordinate system; and/or,
   a second acquiring module, configured to control the Lidar or depth camera and a preset sensor to acquire the second locating image by using a Lidar SLAM technology before the determination module determines the first locating information indicated by the first locating image under the predetermined coordinate system and the second locating information indicated by the second locating image under the predetermined coordinate system.

12. The device as claimed in claim 10, wherein the determination module is configured to:
   determine a plurality of object characteristic points included in the first locating image; and
   mark a plurality of first coordinate points corresponding to the plurality of object characteristic points in the predetermined coordinate system to acquire the first locating information, wherein the first locating information comprises the plurality of first coordinate points.

13. The device as claimed in claim 10, wherein the determination module is configured to:
   determine a plurality of object characteristic points included in the second locating image; and
   mark a plurality of second coordinate points corresponding to the plurality of object characteristic points in the predetermined coordinate system to acquire the second locating information, wherein the second locating information comprises the plurality of second coordinate points.

14. The device as claimed in claim 10, wherein the combination module is configured to combine the first locating information and the second locating information in one of the following ways to acquire the third locating information:
   Bayesian statistical theory;
   neural network technology;
   Kalman filtering.

* * * * *